United States Patent [19]
Lareva

[11] Patent Number: 5,622,141
[45] Date of Patent: Apr. 22, 1997

[54] CROWD GATE APPARATUS

[75] Inventor: Steven D. Lareva, Paris, Mich.

[73] Assignee: Vern Schooley, Long Beach, Calif.

[21] Appl. No.: 640,502

[22] Filed: May 1, 1996

[51] Int. Cl.⁶ ....................................... A01K 1/02
[52] U.S. Cl. ............................................. 119/843
[58] Field of Search ................................. 119/843, 845, 119/846

[56] References Cited

U.S. PATENT DOCUMENTS

| | | | |
|---|---|---|---|
| 2,691,359 | 10/1954 | Anstiss et al. | |
| 3,799,115 | 3/1974 | Fullerton | 119/843 X |
| 3,805,741 | 4/1974 | Thompson | 119/843 X |
| 3,908,599 | 9/1975 | Flocchini | 119/843 |
| 3,921,586 | 11/1975 | Sweeney | 119/843 |
| 4,006,714 | 2/1977 | Goossen | |
| 4,445,460 | 5/1984 | Stencil | 119/843 |

Primary Examiner—Thomas Price
Attorney, Agent, or Firm—Fulwider Patton Lee & Utecht, LLP

[57] ABSTRACT

A crowd gate suspended pivotally from an overhead carriage driven along a track above a herding area from an entry to an exit by an endless chain slidably coupled to the carriage. The central portion of a lift chain connected on its bottom end to the bottom of the gate and on its top end to the drive chain and arranged to be arrested by a hanger as the carriage moves toward the entrance allowing the drive chain to continue travel resulting in the lift chain being drawn upwardly to draw the gate upwardly to clear a path to receive a group of animals thereunder from the entrance to then be herded toward the exit as the gate is advanced by such drive chain toward the exit. A lost motion device may be incorporated to permit the gate to, upon contacting an animal in the herding area, pivot rearwardly relative to the carriage to prevent damage to the gate. In one embodiment, the gate is electrified to provide a goading shock to the animals.

22 Claims, 4 Drawing Sheets

CROWD GATE APPARATUS

BACKGROUND OF THE INVENTION

1. Field of the Invention

The crowd gate apparatus of the present invention is intended to move animals through a herding area, such as dairy cattle, to be herded into a milking parlor.

2. Description of the Prior Art

Dairy farming is typically a low profit margin enterprise thus demanding that the operation be conducted with a minimum amount of manpower. A popular practice is to construct dairy barns with free stalls allowing the cattle to run free in a pen-like area. Then, for milking purposes at least twice a day, the cattle may be passed progressively through what is popularly termed a milking parlor where batches of, for instance, ten to twenty cattle area milked at a time.

Many milk producers divide their cattle in separate low and high production groups. These groups may each include on the order of fifty to several hundred milking cows. As milking time approaches, certain ones from the selected group to be milked are herded along a herding area from an entrance to an exit which serves as an entrance to a milking parlor where the cattle from the individual batches may be lined up on elevated platforms on opposite sides of a pit where the workmen might apply the milking equipment. Sanitation requirements dictate that the milking parlor area be kept relatively clean and free to trackings which might be tracked by workmen from the herding area.

Crowd gates have become popular for use in dividing off groups of cattle into the herding area and then ushering them along the herding area to the exit therefrom and into the milking parlor. A group of cattle to be herded through the herding area may number on the order 20 to 30, or even more. Because these cattle may weigh upwardly of 1,500 pounds, the individual animals and combinations thereof pose a significant threat to surrounding structure. Cattle can become balky, resistant to herding in the direction desired, and can even bunt or push one another forcefully into surrounding structure. Consequently, numerous different approaches have been taken in effort to provide a crowd gate having sufficient structural integrity or animal repelling characteristics to provide for effective control of the animals while being crowded through the herding area. One such device includes a relatively massive overhead carriage construction for carrying a gate constructed of heavy, sturdy pipe material to be conveyed along the herding area on overhead tracks and is responsive to contact with resistant animals to stop its forward progress pending movement of the animal from its balky position. A device of this type is shown in U.S. Pat. No. 3,805,741 to Thompson. Such devices suffer the shortcoming in that they are relatively expensive to manufacture and install and have proven somewhat ineffective where the animals continue to resist movement in response to the relatively light contacting forces of the gate.

Other efforts have led to the proposal of the type of gate carried from an overhead track and translated therealong by means of endless cables on the opposite sides of the herd area to draw the gate toward the exit area. An effort is made to provide a pair of tethers which are intended to, as the gate approaches the exit area and the carriage is stopped, continue travel with the drive cables to purportedly be drawn around an elevated sheave to draw the bottom of the gate upwardly toward the exit area to clear a pathway into the herding area. A device of this type is shown in U.S. Pat. No. 3,921,586 to Sweeney. Devices of this type suffer the shortcoming that the animals standing near the herding area entrance in the path of the gate, anxious to enter, will block raising of the gate causing severe structural damage to the gate and driving mechanism.

In recognition of these various shortcomings in the prior art, it has been proposed to provide a herding curtain in the form of a plurality of an overhead bar suspending electrified vertically, loose electrically conductive chains spaced transversely apart to purportedly herd the animals along as the bar is advanced over a herding area. A device of this type is shown in U.S. Pat. No. 4,006,714 to Goossen. Device of this type, while effective to provide some herding capability, are relatively ineffective in that the more balky cattle merely pass rapidly back under the curtain. Moreover, the more obedient animals become conditioned to the fact that the curtain is electrified and resist going near the curtain while the chains are in their lowered position.

Thus, there exists a need for an inexpensive, lightweight and practical crowding gate which is not subject to damage from balky or highly active animals but yet which is effective to control herding of the animals toward an exit area.

SUMMARY OF THE INVENTION

The crowd gate apparatus of the present invention is characterized by an overhead carriage carried on a longitudinal track device and slidably engaged with a drive chain to be driven to and fro over a herding area having entrance and exits at the opposite ends. Suspended from the carriage is a laterally extending gate which may be electrically conductive and electrified. A lifting mechanism includes a hanger engaged by a moveable catch carrying a lift sprocket over which a lift chain is threaded to, as the gate approaches the entrance area, lift the bottom of the gate and drive the carriage on the track slidably relative to such drive chain.

Other objects and features of the invention will become apparent from consideration of the following description taken in conjunction with the accompanying drawing.

DESCRIPTION OF THE PREFERRED EMBODIMENTS

The crowd gate apparatus of the present invention includes, generally, a carriage 21 carried on a rail device 23 and drawn to and fro along a herding area 25 between an entrance area 26 and an exit area 29. A gate, generally designated 31, is carried from the carriage 21 by means of laterally spaced apart suspension rods 35 which are mounted from such carriage by means of respective pivots 37. An endless chain, generally designated 41, is engaged with the carriage by means of a tubular slide 43. A lift chain, generally designated 47, is connected on it upper end at a juncture point 49 to the drive chain 41 and threads over a pinion 53 carried from a catch 59 to be connected on its bottom end 55 to the bottom of the gate. The catch 59 is conveniently carried slidably on the drive chain 43 to, as the carriage 21 is drawn to the right as viewed in FIGS. 1 and 2, engage a hanger 61 to arrest and support such catch. The juncture point 49 of the lift chain 47 will continue on to the right to take up any slack and draw the bottom of the gate upwardly to the broken line position shown in FIG. 3.

It will be appreciated that in the enterprise of running a dairy herd efficiency and sanitation during the milking process is of utmost importance. It is common practice in the dairy business to provide a milking parlor 61 having an entry door 27 which defines the exit from a herding area 25. Cows to be milked are herded to the door 27 onto a walkway 63 raised above the floor 65 of a milking pit so that, when stanchioned, will present their respective udders for convenient access during the milking process. To save time in ushering the animals through the exit door 27 of the herding area 25, crowding gates have been proposed to be selectively advanced along the herding area 25 toward the door 27 to direct the desired number of cattle through such door. It is desirable that such a crowding gate be of relatively lightweight construction and be effective to crowd the cattle along the herding area 25 in a disciplined manner. It is this purpose to which the crowding gate of the present invention is directed.

The track device is conveniently in the form of a pair of parallel tracks 71 and 73 mounted overhead on the lateral opposite sides of the herding area 25. The carriage 21 is in the form of a laterally projecting axle 75 carried on its opposite ends from support wheels 77 traveling on such rails 71 and 73. The carriage is formed on its laterally opposite ends with respective electrically insulative downwardly opening clevises 79 which receive the upper ends of the respective suspension rods 35 and are connected thereto by means of respective laterally projecting pivot pins 81. Projecting forwardly of the respective clevises 35 are horizontal stabilizer arms 83 which turn upwardly at their forward extremities and mount from respective stabilizer wheels 85. The suspension rods 35 are constructed of electrically conductive metal and carry at their respective lower extremities a gridwork of electrically conductive, relatively lightweight upper and lower rails 87 and 89 between which are mounted respective individual vertical rods 91 spaced horizontally apart.

The slide 43 is in the form of a longitudinally extending square tube mounted centrally beneath the axle 75 and receiving slidably therein the lower run 95 of the drive chain 41. The slide is formed with a lever arm 101 projecting forwardly of the axle 75 and a stop tube 103 projecting rearwardly thereof and defining at its rear end a stop 105 which may be selectively abutted by the juncture point 49 of the lift chain 47 to thus push the tube 43 and consequently the carriage 21 to the left as the drive chain 41 is driven to drive the lower run 95 to the left.

The catch 59 is of generally T-shaped construction and is formed with a through slide track 106 (FIG. 4) configured with a general square cross section to hold such catch upright on the lower run 95 to float thereon. The horizontal top flange 107 of the catch 59 is configured to be caught in the forwardly opening hook 111 of the hanger 61 as the carriage 21 is moved to the right as viewed in FIG. 3.

Figures 4, 5:
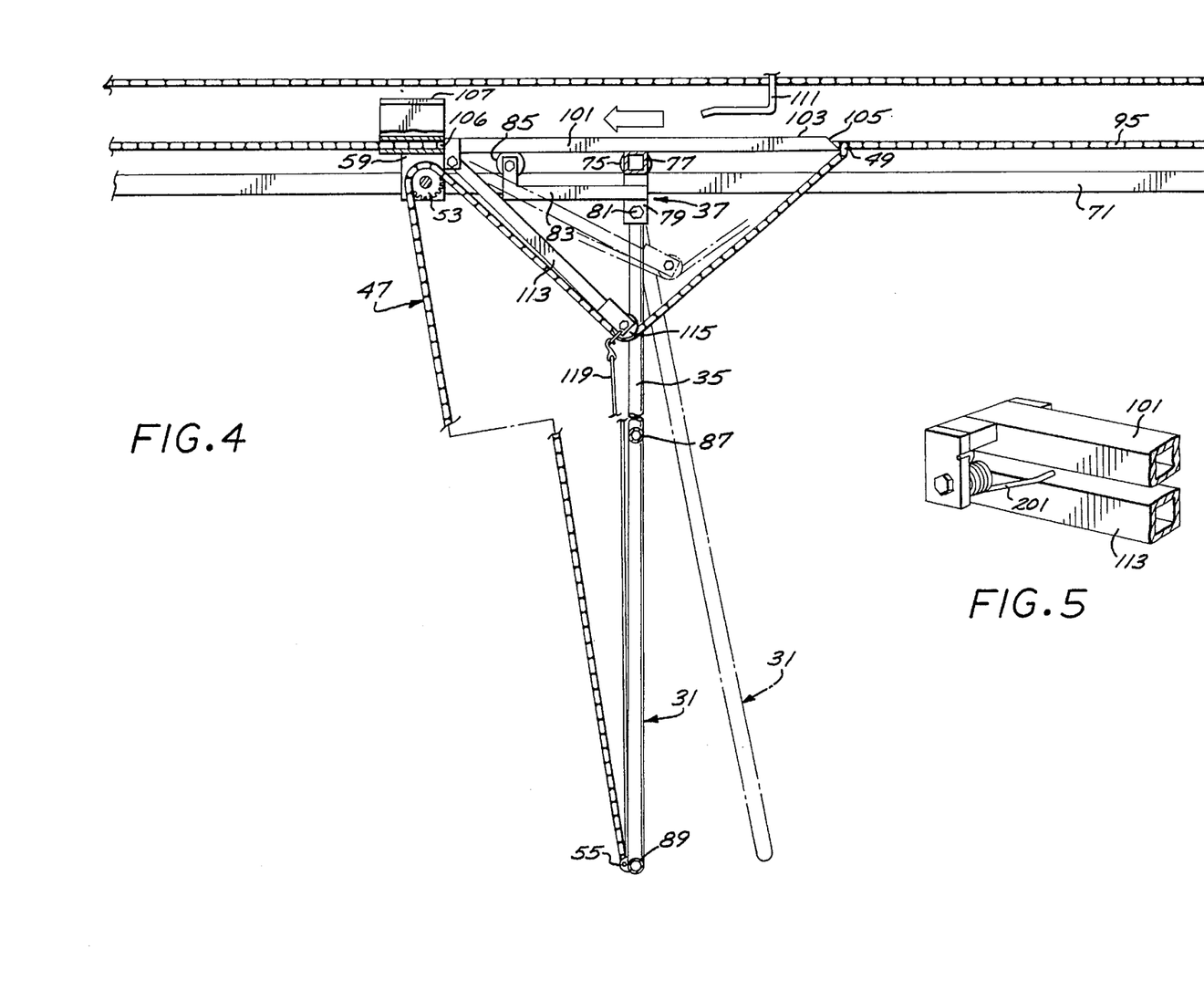
FIG. 4 is a side elevational view showing the gate in a still different position.
FIG. 5 is a perspective view of a modification of the animal crowd gate shown in FIG. 1.

Carried pivotally from the front end of the lever arm 101 is a tensioning arm 113 which carries at its rearwardly projecting free end a pulley 115 which rides on the slack length of lift chain 47 running rearwardly from the pinion 53 to the juncture point 49 of such chain as viewed in FIG. 4. An elastic biasing cord 119 is connected between the bottom of the gate 31 and the free end of such tensioning arm 113 to maintain tension thereon.

The drive chain 41 threads on its opposite ends over a respective drive sprocket 121 and idler sprocket 123. The drive sprocket 121 is coupled to a transmission 127 to an air powered motor 13 1. Such motor is a reversible motor and is controlled by a three position switch 135 carried on a control box 137 located on a wall of the milking parlor 61. For the purposes of this invention, the term "chain" and "sprocket" is understood to include other pulley and flexible endless drive mechanisms, such as cables and belts.

Figure 1:
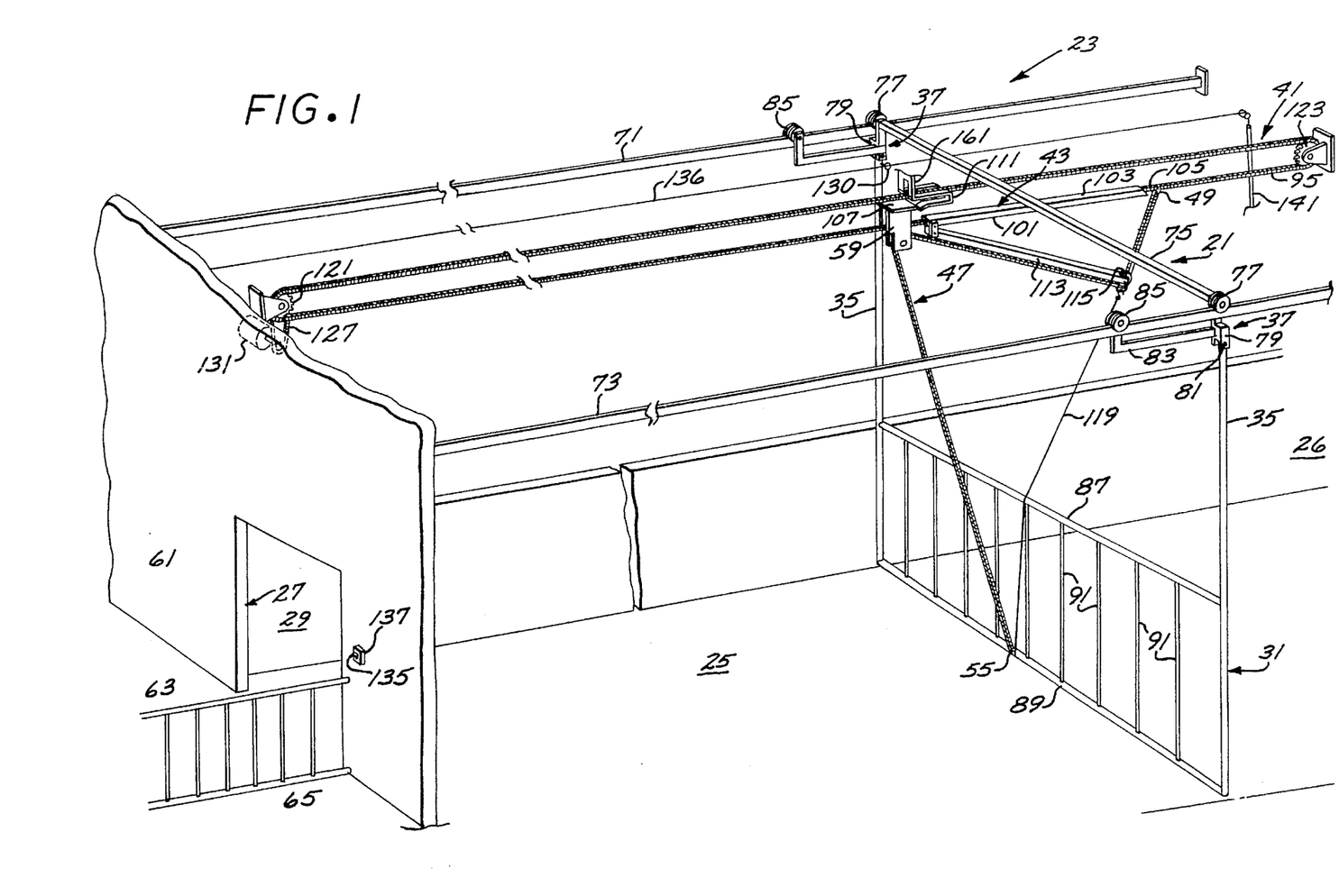
FIG. 1 is a broken perspective view of an animal crowding gate apparatus embodying the present invention.

Referring to FIG. 1, the one post 35 mounts an electrically conductive eye bolt 130 and threaded therethrough and connected at its opposite ends to the respective end walls of the herding area 25 is an electrically conductive wire 136 energized by means of an electrical lead 141 to thereby provide current to the gate 31 to maintain it electrified.

Figure 2:
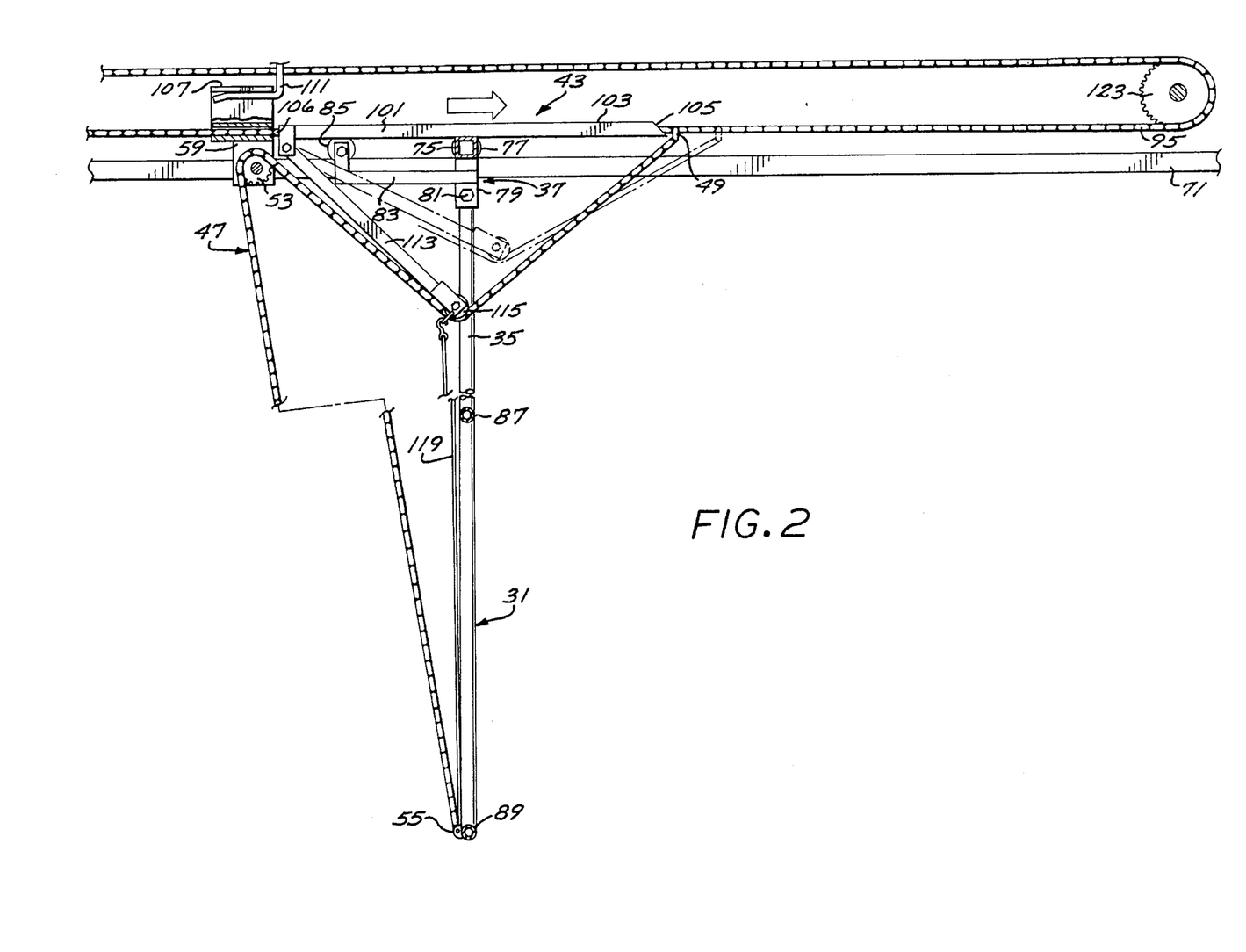
FIG. 2 is a broken side view of the crowding gate shown in FIG. 1.
Figure 3:
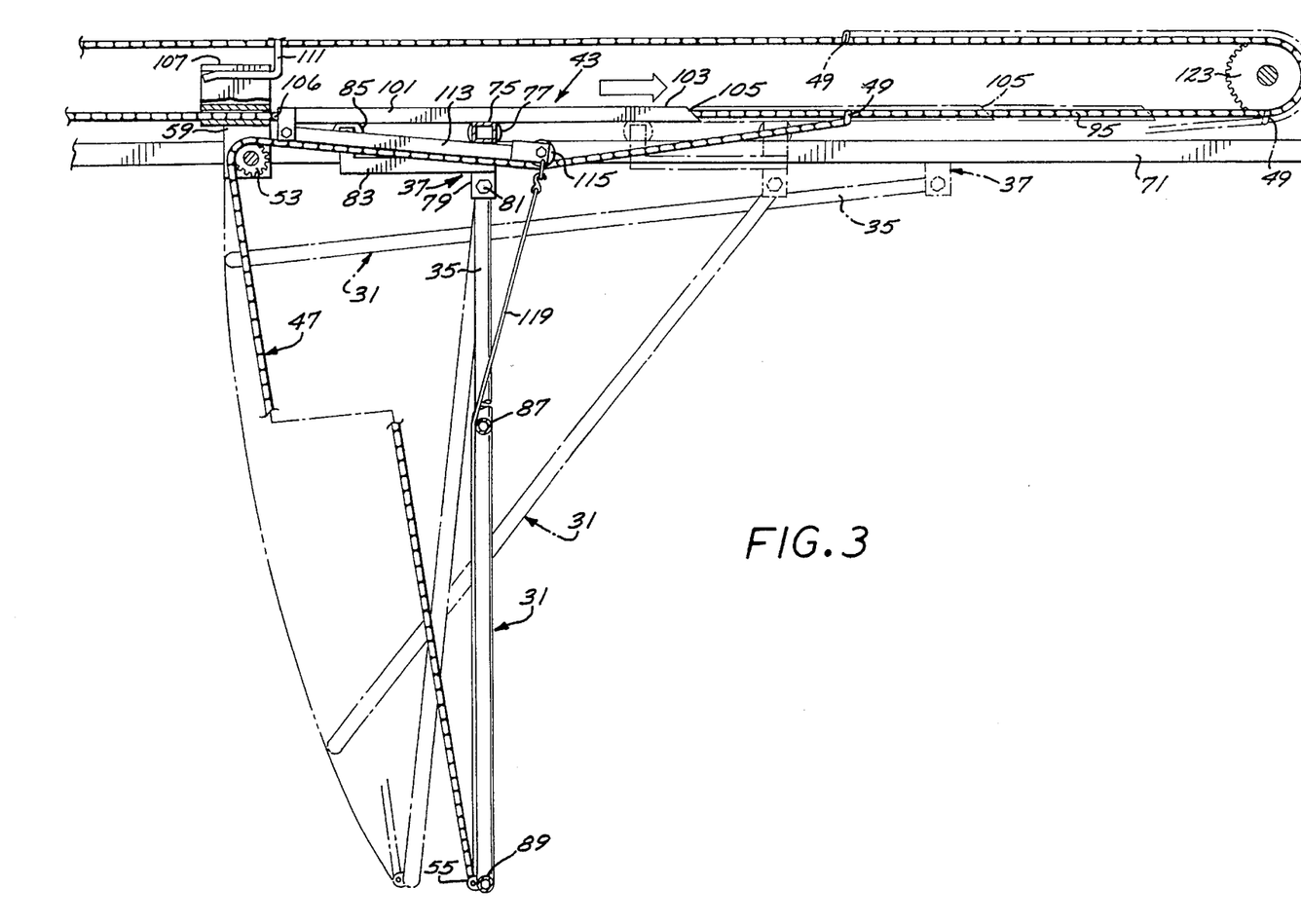
FIG. 3 is a side elevational view similar to FIG. 2 but showing the gate in a different position.

In operation, when it is desired to move a selected number of cows into the herding area 25, the switch 135 may be actuated to reverse the motor 131 and drive the lower run 95 of the drive chain 41 to the right as viewed in FIG. 2. As such lower run 95 moves to the right, it will create a frictional drag within the slide tube 43 thus drawing the carriage 21 also to the right. When the catch 59 engages the hook 111 of the hanger 61, further travel to the right of such catch 21 will be arrested and further travel of the lower run 95 will serve to pass such run through the slide tube 43 to carry the juncture point 49 of the lift chain 47 to the right thereby tending to take up the slack in such chain-resulting in the free end of the tensioning arm 113 being raised from the broken line position shown in FIG. 4 to the horizontal position shown in FIG. 3 as the tension of the elastic cord 119 is overcome. It will be appreciated that this operation serves as a lost motion function to, after selected further travel of the lower run after the carriage has been arrested, actuate raising of the gate itself. As the drive chain continues to travel, the juncture point 49 will be drawn up and around the idler sprocket 123 to the position shown in FIG. 3 thereby further drawing the lift chain and thereby lifting the bottom gate 31 relatively straight up in a nearly vertical plane through the broken line positions shown in FIG. 3 as the slide tube 61 is driven to the right on the chain run 95. This actions moves the gate clear of the awaiting herd of cattle disposed to the right of the gate (FIG. 4) prepared to enter the herding area 25. With the gate so raised a selected number of cattle can pass thereunder and be positioned in the herding area 25 ready to be moved therethrough in a controlled manner.

Then, the switch 135 may be repositioned to the forward position thereby directing the motor 131 to its forward direction and rotating the drive sprocket 121 to draw the bottom run 95 of the drive chain 41 to the left. As such bottom run 95 is drawn to the left, it will be appreciated that the juncture 49 (FIG. 3) will travel back around the sprocket 123 to be moved to the left with the bottom run 95 of the drive chain thus providing slack in the lift cable to allow the weight of the gate 31 to draw such lift chain downwardly and the slide 61 to slide to the left on the drive chain to drive such gate downwardly in a rectilinear fashion to drive the lower edge thereof downwardly in a somewhat vertical path to divide the group in the herding area from the rest of the herd. Such travel of the bottom run 95 to the left will also cause such juncture 49 to act as a pusher engaging the stop end at the right hand end of the slide tube 103 to thereby positively push the carriage 21 to the left thereby positively pushing the gate down. It will be appreciated that travel of such carriage to the left will also drive the left end of the lever arm 101 against the catch 59 to push it to the left of the hanger hook 111. Continued travel will carry the gate 31 to the left thus herding the cattle toward the exit door 29. It will be appreciated that the electrical current in the wire 135 will maintain a charge on the gate 31 such that any balky cattle failing to move forward with such gate will be administered an electrical shock which will tend to move them smartly forward. When the group of cattle have been moved sufficiently far to the left in the herding area 25 to force the desired number through the door 29 to fill the stanchions in the milking parlor, the switch 135 will be deactutated to thus discontinuing movement of the drive chain 41.

It will be appreciated that as the carriage 21 is moved to the left relative to the catch, or as cattle move about in the herding area 25, various ones of such cattle may come into contact with the gate 31 or may be butted or pushed into such gate or fall against it, thus striking the gate with substantial force. It will be appreciated, however, that any such force applied to the front of the gate 31 will be met with little resistance since the slack in the drive chain 47 will allow the drive chain to be fed over the sprocket 53 causing such sprocket to rotate in a counterclockwise direction, as viewed in FIG. 4, thereby leaving the gate free to swing to the right. Consequently, application of high forces to such gate are avoided thus removing any necessity of providing heavy structural components having sufficient strength to withstand the force of one or more full grown cattle charging thereagainst. At the same time, it will be appreciated that when such cattle do strike the gate, they will receive an electrical shock thus goading them into endeavoring to make a quick recovery and move to the left with some degree of dispatch thus allowing the gate to swing down in pendulum fashion to its original vertical position.

As the milking process for the batch of cattle in the milking parlor is completed, that batch will be discharged out a milking parlor exit door (not shown), to leave the parlor free for another batch to be received through the door 29 to be directed onto the walkway 63. Thus, the control switch 135 may then again be actuated to draw the lower run 95 of a drive chain a selected distance further to the left (FIG. 4) thus drawing the carriage 21 and consequently the gate 31 again to the left thus urging another group of cattle to move through the door 29. This process will then be repeated until the entire batch of cattle in the herding area 25 has been urged through the door 29. The workmen may then actuate the control switch 135 to again reverse the motor 131 and drive the lower run 95 of the drive chain to the right thus causing the frictional engagement of such chain within the tube 43 to draw the carriage to the right until it reaches the entry area where it will be again raised to receive another group of cows to be milked. The process may then be repeated until the full herd of cows has been herded into the milking parlor 61.

Referring to FIG. 5, there is shown a modification for the tension arm 113 which includes a torsion spring 201 which serves to bias such torsion arm downwardly in a clockwise direction as viewed in FIG. 5 to thereby eliminate the need for an elastic cord 119.

From the foregoing, it will be appreciated that the animal crowd gate of the present invention provides a relatively lightweight and highly effective crowd gate apparatus which is inexpensive to manufacture and which will enjoy a long and trouble free life.

Various modifications and changes may be made with regard to the foregoing detailed description without departing from the spirit of the invention.

What is claimed is:

1. Crowd gate apparatus mounted in a herding area to herd animals from an entry area to an exit area and comprising:

an overhead track device extending from said entrance area to said exit area;

a wheeled carriage on said track device, including a slide and a stop facing said entrance area;

an electrically conductive gate laterally spanning said herding area, having a front side facing said exit area and including suspension rods;

pivots suspending the respective said rods from said carriage;

an electrical lead extending along said track and slidably coupled with said gate for applying an electrical charge to said gate to apply a goading shock to animals in said herding area contacting said gate;

a drive including a pair of sprockets mounted at the opposite ends of said herding area, an endless chain over said sprockets and having a lower run slidably received in said slide to frictionally engage said slide to, when said run travels toward said entrance are to be functionally engaged by said run to draw said carriage toward said entrance, and a reversible drive motor coupled with one of said sprockets to drive said chain and draw said carriage back and forth on said track drive;

a pusher on said lower run and engaged to, when said run travels toward said exit area, engage said stop and push said gate therewith; and a lifting device mounted over said herding area, coupled with said gate, and operable to, when said carriage approaches said entry area, draw the bottom of said gate upwardly.

2. A crowd gate apparatus as set forth in claim 1 wherein:

at least one of said suspension rods is electrically conductive and said apparatus includes:

electrical insulators interposed between said rods and said carriage;

an electrically conductive eye bolt mounted to said one of said suspension rods and wherein:

said lead is threaded through said eye bolt to make electrical contact therewith.

3. A crowd gate apparatus as set forth in claim 1 wherein:

said carriage includes a tube defining said slide and frictionally receiving said drive chain to, upon travel of said carriage toward said entrance, slide therealong;

said lifting device includes a catch formed with a slide track receiving said lower run of said chain to slidably support said catch thereon for travel with said lower run through a path leading toward said entrance area, said catch including on the top side thereof a hook and mounting on the bottom side a lift pinion;

a lift chain coupled on one end with said gate, threaded over said lift pinion and connected on its opposite end with said drive chain;

a hanger mounted over said herding area to be engaged by said hook as said drive chain moves said carriage toward said entrance to arrest said catch to, as said drive chain is drawn slidably through said slide toward said entry area, draw said opposite end of said lift chain therewith to draw said lift chain over said lift pinion to raise a bottom of said gate.

4. A crowd gate apparatus as set forth in claim 3 wherein:

said pivots are configured to provide free swinging of said gate toward said entrance area; and said lift chain is of a sufficient length to, when said rods suspend said gate in a vertical position, allow free swinging of said gate toward said entrance area upon contact by said animals from said front side.

5. A crowd gate apparatus as set forth in claim 4 that includes:

a tensioning device on said lift chain taking up slack and maintaining it in tension when said gate is in said vertical position.

6. A crowd gate apparatus as set forth in claim 4 that includes:

a tensioning arm pivotally carried on one end from said carriage and projecting rearwardly therefrom toward said entry area to terminate in a rear end, and an idler pulley on said rear end to engage said lift chain so the weight of said tension arm will tend to maintain tension on said lift chain.

7. A crowd gate apparatus as set forth in claim 6 that includes:

tensioning means coupled with said tensioning arm to urge said rear end downwardly.

8. A crowd gate apparatus as set forth in claim 7 wherein:

said tensioning means include a resilient cord coupled between said tension and said gate.

9. A crowd gate apparatus as set forth in claim 7 wherein:

said tensioning means include a torsion spring coupled with said tension.

10. A crowd gate apparatus as set forth in claim 1 wherein:

said carriage includes at least one support wheel for riding on said track device, a forwardly projecting stabilizing arm projecting toward said exit area to terminate in a front end and a stabilizing wheel on said front end to ride on said track device.

11. A crowd gate apparatus as set forth in claim 1 wherein:

said track device includes a pair of parallel tracks; and said carriage includes wheels riding on the respective said tracks.

12. A crowd gate apparatus as set forth in claim 1 wherein:

said sprockets include chain teeth and said chain is in the form of a link chain.

13. A crowd gate apparatus as set forth in claim 1 wherein:

said drive motor is in the form of an air motor.

14. A crowd gate apparatus as set forth in claim 1 wherein:

said gate includes a laterally projecting gridwork of vertical and horizontal electrically conductive elements.

15. Crowd gate apparatus mounted in a herding area to herd animals from an entry area to an exit area and comprising:

an overhead track device extending from said entrance to said exit areas;

a wheeled carriage on said drive track device and including a slide having a stop facing said entrance area;

a gate laterally spanning said herding area and having a from side facing said entrance and including suspension rods;

pivots suspending the respective said rods from said carriage;

a drive including a pair of sprockets mounted at the opposite ends of said herding area, an endless chain threaded over said sprockets, having a run received in said slide, and a pusher removingly engaging said stop to, upon travel of said run toward said exit area, push said gate toward said exit area and a reversible drive motor coupled with one of said sprockets to drive said chain and draw said carriage back and forth on said track device;

a lifting device including a catch engagable with said carriage to be drawn along a predetermined path and including a lift pinion;

a hanger mounted over said herding area engaging said catch as said catch travels toward said entrance area; and a lift chain coupled on one end with said gate, threaded over said lift pinion and connected on its opposite ends with said drive chain to, said run travels toward said entrance area and said catch engages said hanger, be drawn over said lift pinion to raise the bottom of said gate and drive said slide along said run toward said entrance area.

16. A crowd gate apparatus as set forth in claim 15 wherein:

said pivots are configured to provide for pivoting of said gate toward said entrance; and said lift chain is of a sufficient length to, when said rods suspend said gate in a vertical position, allow free swinging of said gate toward said entrance upon contact by said animals from said front side of said gate.

17. A crowd gate apparatus as set forth in claim 15 wherein:

at least one of said suspension rods is electrically conductive and said apparatus includes:

electrical insulators interposed between said rods and said carriage;

an electrically conductive eye bolt mounted to said one of said suspension rods and wherein:

an electrical lead is threaded through said eye bolt to make electrical contact therewith.

18. A crowd date apparatus as set forth in claim 15 wherein:

a tensioning device on said lift chain take-up slack and maintain it in tension when said gate is in a vertical position.

19. A crowd gate apparatus as set forth in claim 15 that includes:

a tensioning arm pivotally carried on one end from said carriage and projecting rearwardly toward said entry area to terminate in a rear end, and an idler pulley on said rear end to engage said lift chain so the weight of said tension bar will tend to maintain tension on said lift chain.

20. A crowd gate apparatus as set forth in claim 19 that includes:

biasing means coupled with said tensioning arm to urge said rear end downwardly.

21. Crowd gate apparatus to be carried on an elongated overhead track disposed over a herding area having an entrance area at one end and an exit area at the opposite end for being drawn back and forth by an endless chain to be passed under a hanger, said gate comprising:

a carriage including an axle supported on support wheels to travel on said track;

an elongated slide carried from said axle and configured to slidably receive said drive chain and projecting in one direction co-extensive with said track device;

a catch including a lift sprocket;

a hanger to be mounted adjacent said track to releasably engaging said catch; and a lift chain to be attached on one end to said drive chain and to be threaded over said lift sprocket and to connect on the opposite end to said gate to when so attached, upon travel of said carriage along said track toward said entrance area, engage said catch with said hanger, and upon further travel draw said lift chain over said lift sprocket to lift the bottom of said gate and drive said slide along said chain.

22. A crowd gate as set forth in claim 21 wherein:

said slide includes an elongated tube mounted on said carriage.

* * * * *

UNITED STATES PATENT AND TRADEMARK OFFICE
CERTIFICATE OF CORRECTION

PATENT NO. : 5,622,141
DATED : April 22, 1997
INVENTOR(S) : Steven D. Lareva

It is certified that error appears in the above-identified patent and that said Letters Patent is hereby corrected as shown below:

Column 6, line 16, after "track" insert --device--;

Column 7, line 27, after "tension" insert --arm--; and

Column 7, line 30, after "tension" insert --arm--.

Signed and Sealed this

Eighth Day of July, 1997

*Attest:*

*Attesting Officer*

BRUCE LEHMAN

*Commissioner of Patents and Trademarks*